United States Patent [19]

Hartog

[11] Patent Number: 5,228,023
[45] Date of Patent: Jul. 13, 1993

[54] TURNTABLE ASSEMBLY, METHOD OF MANUFACTURING A TURNTABLE ASSEMBLY, AND DISC PLAYER COMPRISING A TURNTABLE ASSEMBLY

[75] Inventor: Pieter Hartog, Dordrecht, Netherlands

[73] Assignee: U.S. Philips Corporation, New York, N.Y.

[21] Appl. No.: 362,190

[22] Filed: Jun. 6, 1989

[30] Foreign Application Priority Data

Dec. 7, 1988 [NL] Netherlands ............ 8802996

[51] Int. Cl.$^5$ ............................................. G11B 23/00
[52] U.S. Cl. ................................. 369/263; 369/271; 369/258
[58] Field of Search ............... 369/258, 262–263, 369/264, 270, 271, 77.1, 77.2, 75.1, 75.2; 360/131–133

[56] References Cited

U.S. PATENT DOCUMENTS

| | | | |
|---|---|---|---|
| 4,079,946 | 3/1978 | Hara et al. | 369/271 |
| 4,131,828 | 12/1978 | Houshi | 369/266 X |
| 4,368,530 | 1/1983 | Darnell, Jr. | 369/264 |
| 4,389,718 | 6/1983 | Rizzello | 369/264 |
| 4,532,622 | 7/1985 | Newbold | 369/270 X |
| 4,679,185 | 7/1987 | Van Sluys | 369/255 |
| 4,910,624 | 3/1990 | Paeters | 360/133 |

*Primary Examiner*—William M. Shoop, Jr.
*Assistant Examiner*—David Martin
*Attorney, Agent, or Firm*—David R. Treacy

[57] ABSTRACT

A turntable assembly for use in a disc player for rotating an optical or magneto-optical disc about an axis of rotation. The turntable assembly comprises a drive shaft (1), a turntable body (3) and a supporting ring (5) forming a supporting surface (P) for the disc. The turntable body is an injection-molded product formed around the drive shaft by means of an injection molding process and connected to the supporting ring while it is being molded.

14 Claims, 3 Drawing Sheets

TURNTABLE ASSEMBLY, METHOD OF MANUFACTURING A TURNTABLE ASSEMBLY, AND DISC PLAYER COMPRISING A TURNTABLE ASSEMBLY

BACKGROUND OF THE INVENTION

The invention relates, inter alia, to a turntable assembly for use in a disc player, in particular for rotating an optical or magneto-optical disc about an axis of rotation, the assembly comprising a drive shaft, a turntable body secured to the drive shaft, and a supporting ring secured to the turntable body and forming a supporting surface for the disc.

Such a turn table assembly is commercially available and is used in a disc player suitable for optically scanning an audio and/or a video disc, as is disclosed in for example U.S. Pat. No. 4,679,185, herewith incorporated by reference. The known turntable assembly comprises an aluminium turn table body, a steel drive shaft and a rubber supporting ring. The turntable body, which is manufactured on a lathe, has a central bore in which the drive shaft is fitted with a specific press-fit. The turntable body has a preformed surface to which the supporting ring is secured with a suitable type of adhesive. In order to ensure that the position of the supporting surface for the disc to be scanned, which surface is defined by the supporting ring, is correct within narrow tolerances the supporting ring is finished, for example by grinding, after it has been secured to the turntable body. A disadvantage of the known turntable assembly is the comparatively high manufacturing cost as a result of the rather laborious manufacturing method comprising a plurality of successive steps. These steps include the manufacture of the turntable body by means of a lathe, mounting and securing the drive shaft in the central bore of the turntable body, cementing the supporting ring to the turntable body, and finishing the supporting ring.

SUMMARY OF THE INVENTION

It is an object of the invention to modify the turntable assembly defined in the opening paragraph in such a way that a construction is obtained which can be manufactured at least as accurately as, but more simply and cheaply than, the known turntable assembly.

To this end the turntable assembly in accordance with the invention is characterized in that the turntable body is an injection-molded or diecast product which is formed around the drive shaft by an injection-molding or diecasting method and which is secured to the supporting ring while being formed. Consequently, the turntable assembly in accordance with the invention comprises a turntable body which is formed in one manufacturing step, during which, in addition, the drive shaft and the supporting ring are connected to the turntable body in an accurately defined position relative to one another.

A preferred embodiment of the turntable assembly in accordance with the invention is characterized in that the turntable body is made of a glass-reinforced plastic material. Such a plastic material, for example polycarbonate containing 30% of glass in the form of spheres, yields very favorable results. In particular, it is found that such a plastic enables the formation of tensile and shrinkage stresses to be controlled effectively, thereby precluding deformations and/or cracking of the turntable body.

It is to be noted that British Patent Application 2,063,548 (herewith incorporated by reference) describes a two-part turn table comprising an upper part and a lower part. The lower part is a molded plastic part which can be coupled to a drive means and in which a metal bearing bushing is secured. The upper part, which may also be made of a plastic material, forms a supporting surface for a conventional audio disc and is detachably connected to the lower part by a snapped connection. The known turntable does not really resemble the turntable assembly in accordance with the invention both in respect of its construction and the attainable wobbling tolerance of the supporting surface.

The invention further relates to a method of manufacturing a turntable assembly for use in a disc player, in particular for rotating an optical or magneto-optical disc about an axis of rotation, in which method a drive shaft, a turntable body and a supporting ring are formed into an integral unit.

Such a method is known for the manufacture of the prior art turntable assembly described above.

It is the object of the invention to provide a novel method enabling the turntable assembly in accordance with the invention to be manufactured in an efficient manner.

To this end the method in accordance with the invention is characterized in that the drive shaft and the supporting ring are placed in an open mold in such a way that the drive shaft extends perpendicularly to a reference face of the mold and the supporting ring extends parallel to said reference face. The mold is then closed and the turntable body is formed around the drive shaft and is also connected by intimate securing contact to the supporting ring by injection-molding. In the method in accordance with the invention the position of the drive shaft and the supporting ring relative to one another is dictated wholly by the mold. This has the advantage that during injection of the plastic material into the mold the entire turntable assembly is formed, the supporting surface, formed by the supporting ring, and the drive shaft occupying exactly the desired concentric and perpendicular position relative to one another without any additional operations or treatments being required.

The inventive method is very suitable mechanization enabling cheap turntable assemblies of accurate dimensions to be manufactured in mass production by means of one accurately manufactured mold.

For specific uses it may be desirable to provide an additionally strenghtened bond between the supporting ring and the turntable body. The invention then provides a solution in that the supporting ring, before it is placed into the mold, is provided with an adhesive layer on one side, after which the supporting ring is positioned in the mold in such a way that the turntable body is formed on the side provided with the adhesive layer. The adhesive is suitably a thermoplastic material which more or less fuses with the plastic in the process of injection molding.

It is another object of the invention to provide a disc player which comprises a frame, an optical scanning unit and a turntable assembly for an optical disc, the assembly comprising a turntable body formed around a drive shaft and connected to a supporting ring by injection-molding. The disc player in accordance with the invention further comprises an electrical drive unit secured to the frame, for rotating the turntable assembly, the turntable assembly carrying means for centering the disc.

The invention will be described in more detail, by way of example with reference to the accompanying drawings.

DESCRIPTION OF THE PREFERRED EMBODIMENTS

Figure 1:
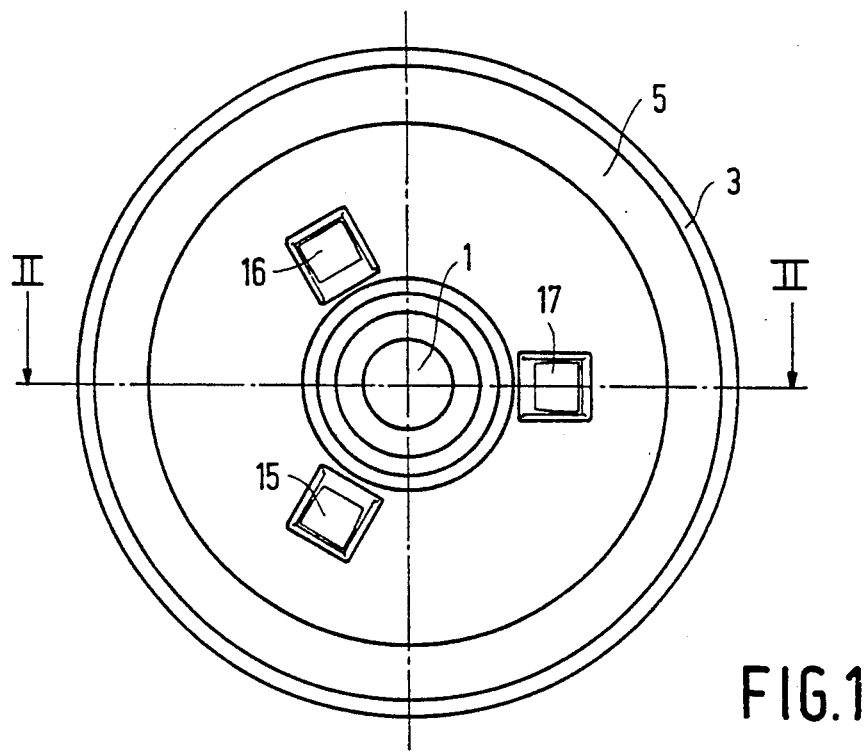
FIG. 1 is a plan view of a turntable assembly in accordance with the invention.
Figure 2:
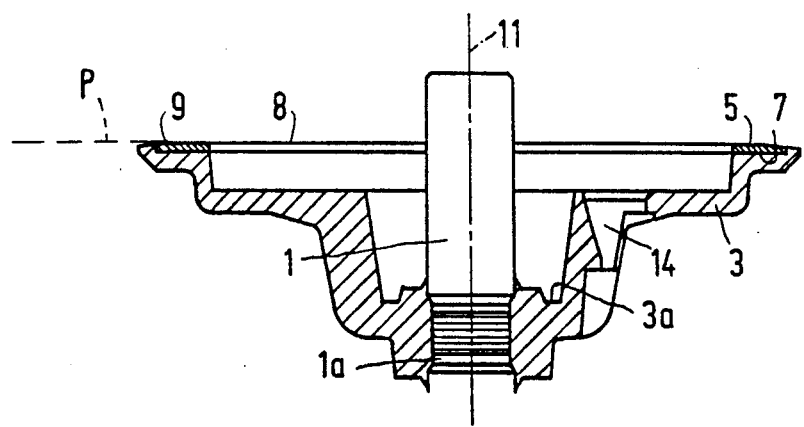
FIG. 2 is a sectional view taken on the line II-II in FIG. 1.

The turntable assembly in accordance with the invention shown in FIGS. 1 and 2 comprises a drive shaft 1, a turntable body 3 and a supporting ring 5. The drive shaft 1 is a metal, preferably steel, shaft, and the supporting ring is made of rubber, for example styrene or butadiene rubber or chloroprene rubber. The turntable body 3 is an injection-molded plastics product which is formed around the drive shaft 1 in a suitable mold. In order to improve the fixation of the turntable body 3 relative to the drive shaft 1 the latter is provided with a profile 1a. During manufacture of the turntable body 3 the supporting ring 5 is connected to the turntable body. Generally, the supporting ring 5 will be provided with a thin layer of an adhesive at the side indicated by the numeral 7. The side 9 of the supporting ring 5, which extends parallel to the side 7, forms a supporting surface P for an optical or a magneto-optical disc to be scanned. The turntable assembly is rotatable about an axis of rotation 11 which coincides with the central axis of the drive shaft 1 and which extends perpendicularly to the supporting surface P.

Figure 3:
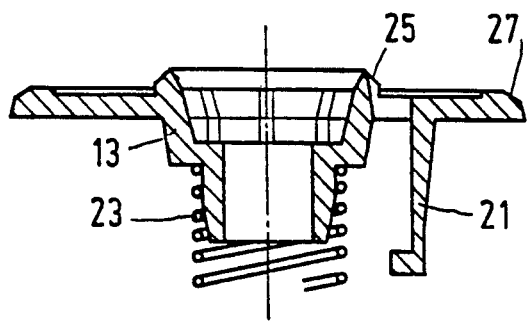
FIG. 3 is a longitudinal sectional view of a centering member cooperating with turntable assembly shown in FIG. 1.

The turntable assembly is constructed to cooperate with a centering member 13 (see FIG. 3). For this purpose the turntable body 3, which in the present example is made of polycarbonate reinforced with glass spheres, is formed with three openings 15, 16 and 17. The centering member 13 shown in FIG. 3, which is also made of a plastic material, for example polycarbonate containing 20% of glass, comprises three fixing hooks, of which only one hook bearing the reference numeral 21 is visible in the drawings. In the assembled condition of the centering member 13 these three fixing hooks engage in the openings 15, 16 and 17 respectively, a compression spring 23 being arranged between the centering member 13 and a mounting surface 3a of the turntable body 3.

The centering member 13 shown in FIG. 3 comprises two conical centering surfaces 25 and 27 for centering a Compact Disc and a Laser Vision disc respectively. In order to enable both centering facilities to be used the centering member 13 is axially movable to a limited extent relative to the turntable assembly in the assembled condition.

Figure 4:
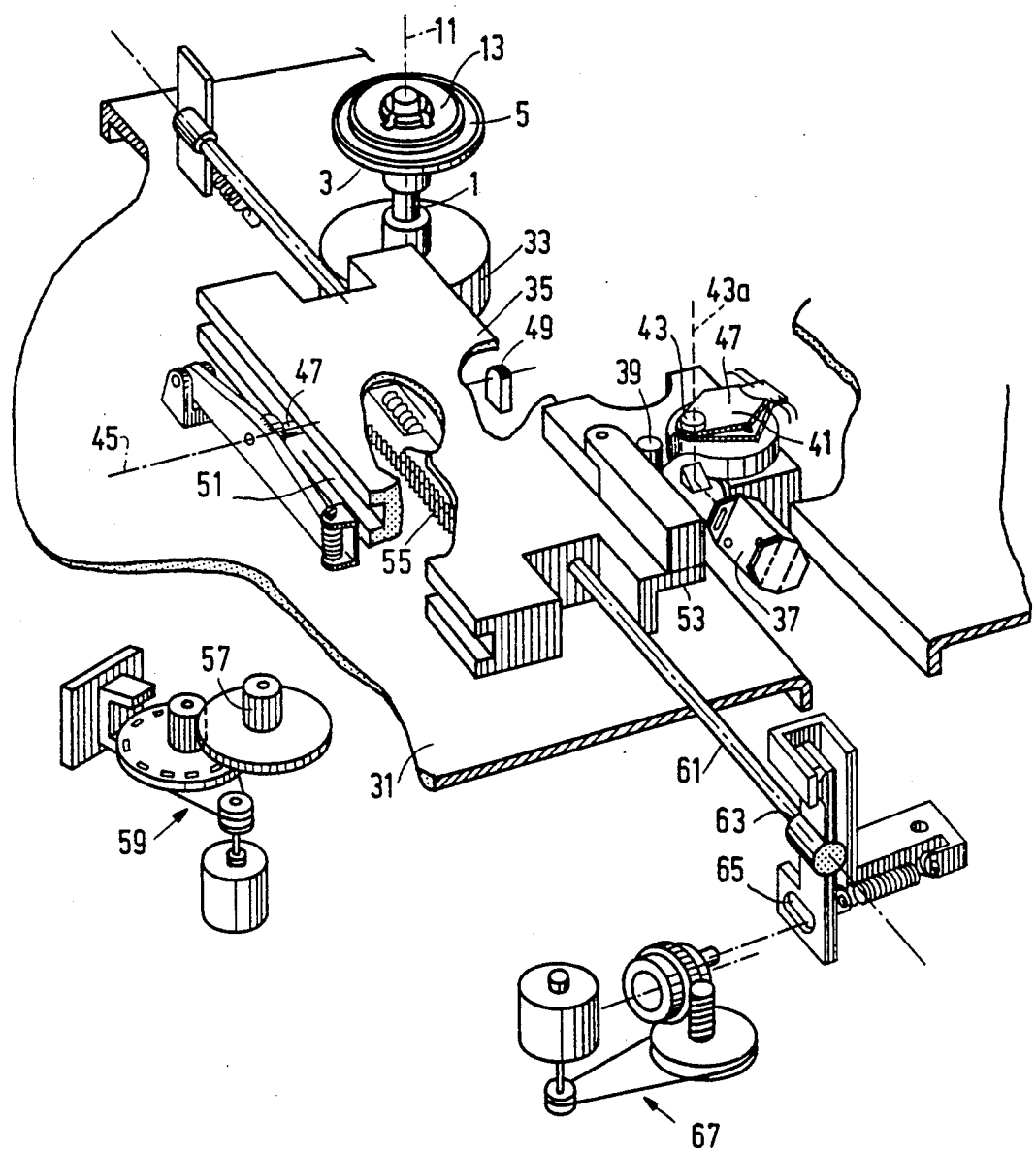
FIG. 4 shows a part of a disc player partly in a cutaway perspective view and partly in exploded view.

The combination to be formed by the turntable assembly shown in FIGS. 1 and 2 and the centering means shown in FIG. 3 is very suitable for use in an optical disc player. FIG. 4 shows an example of such a use.

The disc player in accordance with the invention shown in FIG. 4 comprises a frame 31, to which an electric motor 33 having a motor shaft is secured. The motor shaft is constituted by the drive shaft 1 carrying the turntable body 3 with the supporting ring 5 secured thereto by injection molding. For the purpose of centering an optical disc to be scanned the centering member 13 is centrally mounted on the turntable body 3. The electric motor 33 serves for rotating the turntable assembly about the axis of rotation 11 and also serves for supporting the turn table assembly. The disc player further comprises a slide 35 which is pivotable and translatable relative to the frame 31 and which carries an optical unit 37. The optical unit 37 comprises inter alia a laser, a collimator lens, a read diode, and an angular-position detector 39, and in addition it comprises a focus actuator 41 having an objective 43 with an optical axis 43a. The focus actuator may be of the type as described in European Patent Application 0,268,311 to which U.S. Pat. No. 4,817,078 corresponds herewith incorporated by reference.

The pivotable slide 35 is supported directly in the frame 31 by slide-supporting means. The slide supporting means is constructed in such a way that the slide is capable of performing both a displacement in a radial direction and a pivotal movement about a pivotal axis 45 which is stationary relative to the frame 31. For this purpose the slide-supporting means comprises two supports 47 and 49. The support 47 comprises a shaft end portion which is adjustably secured to the frame 31 and which engages in a groove 51 formed in a longitudinal side of the slide 35. The support 49 comprises a rounded projection on the frame 31 and slidably supports a bearing surface 53 at the underside of the slide 35.

The slide 35 is provided with a gear-rack construction 55 which cooperates with a pinion 57 of a slide drive unit 59. The slide drive unit serves for radially moving the objective 43 relative to the axis of rotation 11 of the turntable assembly, between a first position situated near the turntable assembly and a second position which is more remote therefrom. The disc player further comprises an actuating element 61 which slidably engages an opening in the slide. One end of the actuating element 61 comprises a coupling portion 63 for cooperation with an eccentric mechanism 65 and an electrical drive unit 67. The angular-position detector 39 on the slide can be used for controlling the drive unit 67 to orient the optical axis 43a of the objective 43 perpendicularly to an optical disc placed on the supporting surface of the turntable assembly, i.e. to the side facing the objective.

Figure 5:
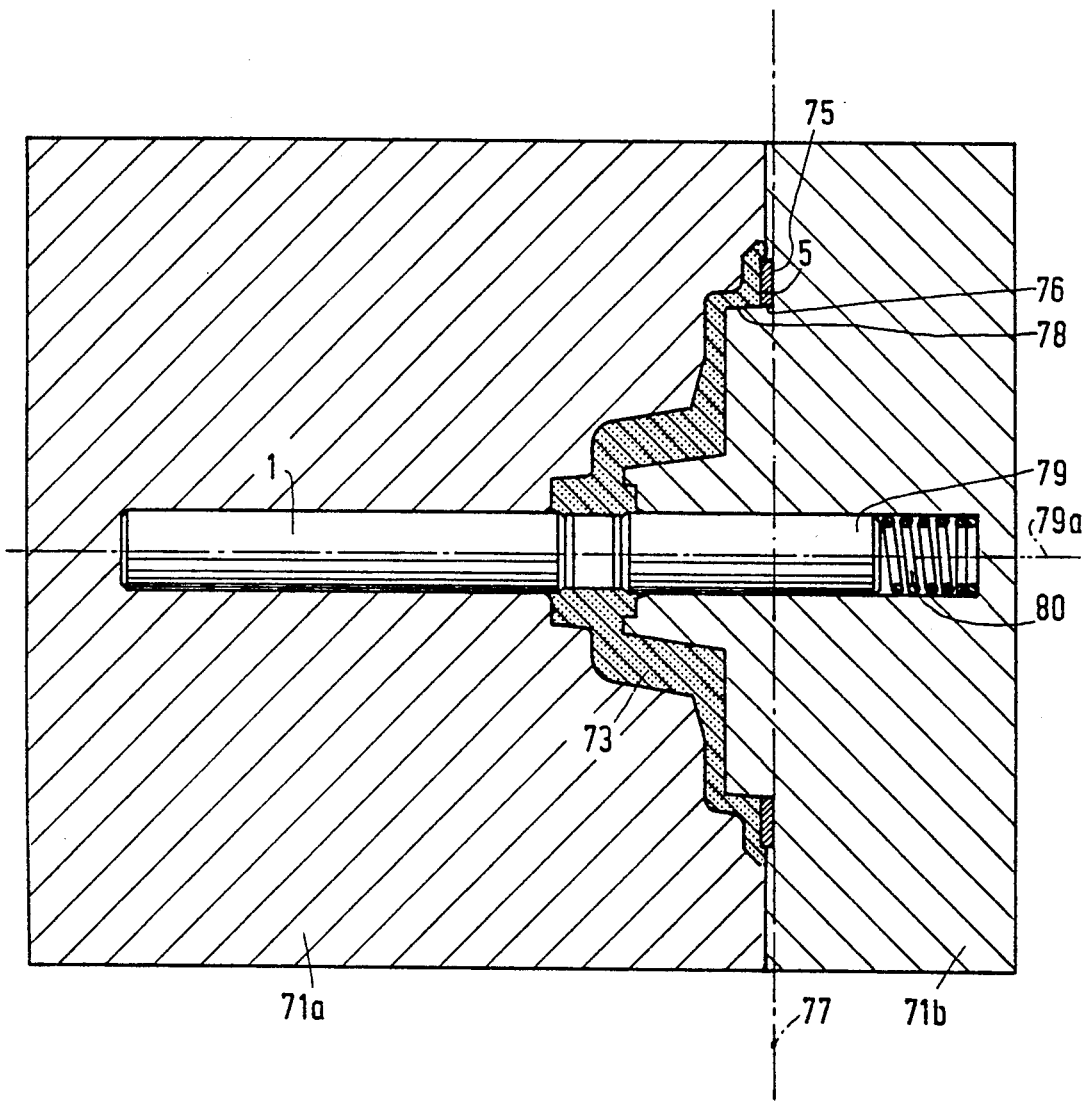
FIG. 5 shows diagrammatically a mold for the manufacture of the turntable assembly shown in FIG. 1.

The method in accordance with the invention will now be described in more detail with reference to FIG. 5. By means of this method the turntable assembly described in the foregoing or a similar turntable assembly is manufactured in a multi-part mold. The mold mainly comprises two separable mold sections, i.e. a first mold section 71a and a second mold section 71b. The facing sides of the mold sections are formed with a plurality of molding features which, in the closed condition of the mold, bound a cavity 73 whose contours correspond to those of the turntable body to be formed. The mold section 71b, which may be constructed as a stationary mold section, has a supporting surface 75 for supporting the rubber supporting ring 5. In the present example the supporting surface 75 coincides with a reference face 77 of the mold section 71b. At the location of the supporting ring 5 the mold section 71b has a circularly cylindrical centering rim 76 which changes to a conical moulding feature 78 in the cavity 73. The mold section 71b has an opening 79 whose central axis 79a is oriented perpendicularly to the reference face 77 for accurately positioning the drive shaft 1. In the opening 79 a compression spring 80 is arranged. The first mold section 71a is movable relative to the mold section 71b along the axis 79a. In the position shown the mold is ready to form a turntable assembly in accordance with the invention. For this purpose a suitable plastic material is injected into the mold cavity 73 via supply ducts not shown, the turntable body 3 being formed around the drive shaft 1 and being connected to the supporting ring 5 as the cavity is filled.

I claim:

1. A turntable assembly for use in a player, for supporting and rotating a removable disc about an axis, said assembly comprising:
   a shaft formed of a first material,
   a turntable formed of a second material, and
   a supporting ring formed of a third material for supporting said removable disc, disposed in a position perpendicular to said shaft,
   characterized in that said second material is a moldable material different from said first and third materials, and
   said turntable is injection molded around said shaft and against said supporting ring, whereby fixation of said shaft and said supporting ring to said turntable is the result of injection molding.

2. An assembly as claimed in claim 1, characterized in that said second material is a glass-reinforced plastic material.

3. An assembly as claimed in claim 2, characterized in that said first material is a metal.

4. An assembly as claimed in claim 1, characterized in that said first material is a metal.

5. An assembly as claimed in any one of claims 1, 2 or 3, characterized in that said third material is rubber, and said supporting ring has an adhesive layer provided thereon at least on the side which is in intimate contact with the turntable, said adhesive forming an enduring bond between the supporting ring and the turntable.

6. A method of manufacturing a turntable assembly for a disc player, comprising providing a drive shaft and a supporting ring, and the steps of:
   providing an open mold having a reference face and means for positioning said supporting ring within the mold, parallel to said reference face,
   placing at least a portion of said drive shaft into said mold with the rotational axis of said shaft extending perpendicularly to said reference face,
   closing said mold, and
   injecting a moldable material into said mold to form a turntable body around said shaft and against said supporting ring, during forming of said turntable body said shaft being fixed to and said supporting ring being connected to said turntable body in accurately defined positions.

7. A method as claimed in claim 6, characterized by providing said mold with a circular cylindrical centering ring, disposed to center said supporting ring placed within the mold about the drive shaft.

8. A method as claimed in claim 7, characterized in that said injecting step comprises injection molding a glass-reinforced plastic material.

9. A method as claimed in claim 8, characterized in that step of providing a drive shaft includes a providing a metal shaft.

10. A method as claimed in claim 6, characterized in that said injecting step comprises injection molding a glass-reinforced plastic material.

11. A method as claimed in claim 6, characterized in that step of providing a drive shaft includes a providing a metal shaft.

12. A method as claimed in any one of claims 6, 8, 9, 10 or 11, characterized in that said supporting ring is formed of a rubber material, and has an adhesive layer provided on a surface which will be contacted by the material of which the turntable is formed.

13. A method as claimed in claim 6, characterized in that said adding step comprises diecasting.

14. A disc record player, comprising a frame, an optical scanning unit, a turntable assembly for supporting a disc to be scanned, and an electrical drive unit secured to the frame for rotating the turntable assembly, said turntable assembly including means for centering the disc, and comprising:
   a shaft formed of a first material,
   a turntable formed of a second material, and
   a supporting ring formed of a third material for supporting said removable disc, disposed in a position perpendicular to said shaft,
   characterized in that said second material is a moldable material different from said first and third materials, and
   said turntable is injection molded around said shaft and against said supporting ring, whereby fixation of said shaft and said supporting ring to said turntable is the result of injection molding.

* * * * *